United States Patent [19]

Hinden

[11] Patent Number: 4,855,561

[45] Date of Patent: Aug. 8, 1989

[54] RESISTANCE WELD PIN AND METHOD OF WELDING

[76] Inventor: Milton Hinden, Rte. #110, Farmingdale, N.Y. 11735

[21] Appl. No.: 241,487

[22] Filed: Sep. 8, 1988

[51] Int. Cl.⁴ .................. B23K 9/20; B23K 11/14
[52] U.S. Cl. .................................. 219/93; 219/98; 219/99
[58] Field of Search ............... 219/93, 99, 98; 411/481, 442, 443, 444, 445, 485, 486, 483, 923

[56] References Cited

U.S. PATENT DOCUMENTS 2,127,685  7/1936  Greulich ........................ 219/105
3,582,603  6/1971  Hinden .......................... 219/99
3,701,878  10/1972 Hinden .......................... 219/98

Primary Examiner—E. A. Goldberg
Assistant Examiner—Scott A. Rogers
Attorney, Agent, or Firm—Mark T. Basseches; Paula T. Basseches

[57] ABSTRACT

A resistance welding pin for connecting insulation batts to ducts comprises a head having a shank and a sharpened tip remote from the head. The shank, adjacent the tip, includes an abutment against which a welding electrode may bear, the electrode being passed through an aperture or passage in the head.

6 Claims, 1 Drawing Sheet

U.S. Patent    Aug. 8, 1989    4,855,561
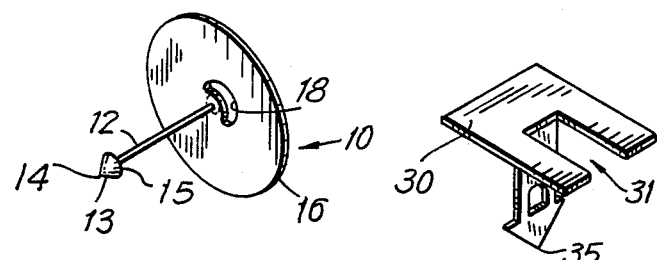
FIG. 1
FIG. 5
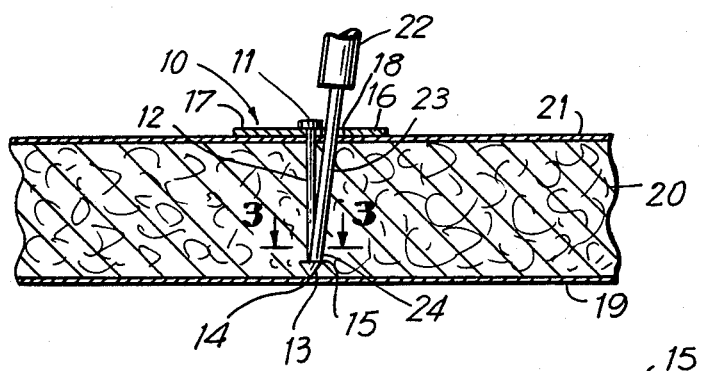
FIG. 2
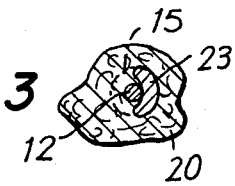
FIG. 3
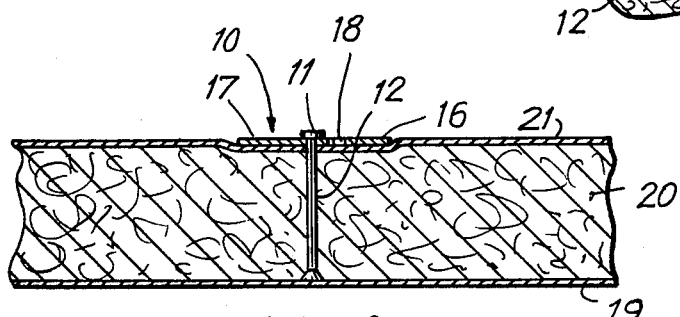
FIG. 4

RESISTANCE WELD PIN AND METHOD OF WELDING

BACKGROUND OF THE INVENTION

1. Field of the Invention

The present invention is directed to a resistance weld pin, and more particularly relates to a welding pin adapted to attach batts of thermal insulation to the interior surface of ducts.

2. The Prior Art

In order to improve the energy efficiency of air conditioning and heating installations employing metal duct work, batts or sheets of insulation ranging from one to two inches are typically secured to the interior surfaces thereof. Attachment is conventionally effected by adhesive alone or in conjunction with headed metallic pins extending through the insulation and bonded to the metal as by impact fastening or welding.

Suitable welding pins are disclosed in U.S. Pat. Nos. 3,624,340 of Nov. 30, 1971; 3,835,285 of Sept. 10, 1974; 3,858,024 of Dec. 31, 1974; 4,429,209 of Jan. 31, 1984; 4,482,795 of Nov. 13, 1984; and 4,614,855 of Sept. 30, 1986.

In each of the noted patents (all of which are owned and/or licensed to the holder of rights under the instant application), the welding pins are attached by passing an electrical current along the shank of the weld pin while the sharpened tip of the pin is pressed against the duct, which is connected to a ground electrode.

While the noted structures are effective to secure the insulation material in position, they are all subject to certain disadvantages in terms of function and economy.

Specifically, since the pin must function as a conductor, the current carrying capacity and, hence, the diameter of the pins must be sufficiently great to carry the high current needed to effect a weld. The necessity for providing thickened shanks to carry welding current, in addition to increasing the cost of the pins, also provides a significant thermal bridge between the interior and the exterior of the ducts, reducing the thermal efficiency of the insulation.

Also, since the welding current passes through the entire length of the pin, the external surfaces of the shank are raised to high temperatures during the welding procedure, with resultant possible damage to the insulating material surrounding the pin.

SUMMARY OF THE INVENTION

The present invention is directed to an improved welding pin and method of applying the same. More particularly, the invention is directed to a welding pin having an enlarged head portion preferably defined by a washer subjacent a smaller sized head, and is characterized by the provision of a thinned shank portion in the area between the head and the sharpened tip.

The pin is provided adjacent the tip with an abutment facing the head, at least a portion of which abutment registers with an aperture formed in the washer.

A welding electrode may thus be inserted through the aperture and pressed against the abutment, whereby current flow is limited to the area of the shank immediately adjacent the tip.

Since the current flow need not include the major length of the shank portion, it is possible to provide a weld pin having a very thin shank, thereby reducing the amount of metal necessarily embodied in the pin, and at the same time decreasing thermal conductivity of the attached pin. Since the major length of the shank is not significantly heated during the welding process, damage to surrounding insulation is minimized.

It is accordingly an object of the invention to provide an improved weld pin and method of attaching the same.

BRIEF DESCRIPTION OF THE DRAWINGS

FIG. 1 is a perspective view of a representative example of a weld pin in accordance with the invention;

FIG. 2 is a sectional view of the weld pin and an attaching electrode shown in conjunction with an insulated duct section;

FIG. 3 is a fragmentary magnified sectional view taken on the line 3—3 of FIG. 2;

FIG. 4 is a view similar to FIG. 2 showing the attached weld pin;

FIG. 5 is a perspective view of an embodiment of the invention.

DETAILED DESCRIPTION OF THE VIEWS

Referring now to the drawings, there is shown in FIG. 1 a weld pin 10 in accordance with the invention, the pin being comprised of a head member 11, an elongate shank portion 12 and a tip portion 13.

The tip portion 13 includes a sharpened point 14 and an abutment portion 15 directed upwardly toward the head.

The abutment portion 15 may take the form of an annular shoulder projecting radially beyond the shank.

The washer 16 may be sleeved over the shank such that the upper surface 17 of the washer underlies the head 11, it being understood that the washer and head may be integrally formed but that, for economy of manufacture, separate elements are preferred. The washer 16 includes arcuate slot 18 for purposes which will appear hereafter.

As shown in FIG. 2, the pin 10 is to be attached to a metallic substrate 19 comprising a duct surface through an insulating batt 20 having a smooth polymeric surface 21. Attachment is effected by forcing the tip 13 through the body of insulation and into contact with the substrate 19 either manually or through the use of a welding electrode 22 comprising the "live" electrode of a resistance welding gun or apparatus known per se.

Preferably the electrode 22 includes an arcuate lower portion 23 terminating in end 24 adapted to engage abutment 15 of the weld pin. Desirably the weld pin is mounted on electrode 22 prior to forcing the pin through the insulation batt so as to assure contact between the base 24 of the electrode and the abutment 15, and prevent the ingress of insulation between the base and abutment, which ingress would interfere with proper current flow.

With the parts disposed as depicted in FIG. 2, welding current is caused to flow through the electrode 22, resulting in melting of the tip portion 13, which is pressed downwardly against substrate 19 by the electrode.

The attached pin is disclosed in FIG. 4.

As will be apparent, the pin will be securely welded to the substrate 19. Importantly, since the welding current is not required to flow through the shank 12 it is possible to use a thin diameter shank material which would otherwise melt in the course of welding.

The shank portion is amply strong to retain the weld pin in position but provides substantially reduced thermal conductivity between the duct substrate 19 and washer 17 when compared to a shank sufficiently large to carry the necessary welding current. Since welding current does not pass along the shank, welding heat is contained primarily in the area of the tip portion and, thus, overheating of the shank, with consequent possible damage to surrounding insulation is minimized.

As will be apparent to those skilled in the art, numerous variations of construction may occur to those familiarized with the instant disclosure without departing from the spirit of the disclosure.

For instance, the weld pin may be made of sheet metal and the abutment portion may be comprised of a boundary of a hole punched in the sheet metal or a projection extending from the sheet metal.

Such a structure is shown, by way of example, in FIG. 5 wherein the weld pin is an integral sheet metal blank having a head 30, a passage 31 formed in the head, from which shank 32 is defined, the shank having an aperture 33 formed therein, the lower surface 34 of which defines an abutment.

In the weld pin of FIG. 5, the weld electrode would extend downwardly through passage 31 and include a hook-like projection at its lower end for engaging abutment 34 and pressing tip 35 against the substrate 19.

Accordingly, the invention is to be broadly construed within the scope of the appended claims.

Having thus described the invention and illustrated its use, what is claimed as new and is desired to be secured by Letters Patent is:

1. A metallic resistance weld pin for the application of insulating batts to ducting or the like, comprising an elongate shank having a sharpened tip portion at one end and an enlarged head at the other, said enlarged head comprising a washer sleeved over said shank and including an aperture formed in said washer at a position offset from the axis of said shank, an abutment portion formed on said shank adjacent said tip portion, said abutment portion being directed toward said head whereby said tip may be biased against a duct by an electrode member inserted through said aperture and biased against said abutment portion.

2. A weld pin in accordance with claim 1 wherein said shank is generally cylindrical and said abutment member comprises an annular shoulder radially displaced from said shank, said shoulder being disposed in a plane generally perpendicular to said shank.

3. A weld pin in accordance with claim 2 wherein said aperture is arcuate and registers with said shoulder.

4. A metallic resistance weld pin comprising a head at one end, a sharpened tip at the other end, and a shank extending between said head and said tip, an abutment formed on said shank adjacent said tip and directed toward said head, and a passage formed through said head in registry with said abutment, whereby a weld electrode may be passed through said passage of said head and engaged against said abutment, thereby to attach said pin to a metallic substrate by current passed through said abutment to said tip.

5. A resistance weld pin comprised of sheet metal and including a head at one end, a sharpened tip at the other end and a shank extending between said head and said tip, an aperture formed in said shank adjacent said tip, a boundary of said aperture defining an abutment directed toward said head and a passage formed through said head in registry with said abutment, whereby a weld electrode may be passed through said passage of said head engaged against said abutment, thereby to attach said pin to a metallic substrate by current passed through said abutment to said tip.

6. The method of applying by resistance welding a weld pin through an insulation batt and to a metallic substrate which comprises the steps of providing a weld electrode having a base portion, providing a weld pin having a head including a passage therethrough, a shank, a sharpened tip, and an abutment formed on said shank adjacent said tip and directed toward said head, inserting said electrode through said passage, engaging said base portion of said electrode against said abutment, forcing said tip against said substrate by pressure exerted by said base portion against said abutment, and thereafter causing a welding current to flow through said electrode, abutment and tip, thereby to melt said tip and weldingly connect said pin to said substrate.

* * * * *